United States Patent

Breske et al.

(10) Patent No.: US 10,073,828 B2
(45) Date of Patent: Sep. 11, 2018

(54) UPDATING LANGUAGE DATABASES USING CROWD-SOURCED INPUT

(71) Applicant: Nuance Communications, Inc., Burlington, MA (US)

(72) Inventors: Christopher Breske, Seattle, WA (US); Ethan Bradford, Seattle, WA (US); David Field, Seattle, WA (US); Wendy Bannister, Edmonds, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 47 days.

(21) Appl. No.: 14/634,654

(22) Filed: Feb. 27, 2015

(65) Prior Publication Data
US 2016/0253313 A1  Sep. 1, 2016

(51) Int. Cl.
G06F 17/21  (2006.01)
G06F 17/27  (2006.01)
G06F 17/24  (2006.01)

(52) U.S. Cl.
CPC .......... *G06F 17/2735* (2013.01); *G06F 17/24* (2013.01); *G06F 17/241* (2013.01); *G06F 17/276* (2013.01)

(58) Field of Classification Search
CPC .... G06F 17/2735; G06F 17/241; G06F 17/24; G06F 17/243; G06F 17/273; G06F 17/274; G06F 17/275; G06F 17/28; G06F 17/2809; G06F 17/2785; G06F 17/2818; G06F 17/2836; G06F 17/2845; G06F 17/289

USPC ..... 704/1–10, 250–251, 255, 257, 266, 235, 704/275, 243

See application file for complete search history.

(56) References Cited

U.S. PATENT DOCUMENTS

| | | | |
|---|---|---|---|
| 2010/0070262 A1* | 3/2010 | Udupa | G06F 17/2735 704/7 |
| 2011/0282648 A1* | 11/2011 | Sarikaya | G06F 17/2818 704/7 |
| 2012/0166367 A1* | 6/2012 | Murdock | G06Q 30/02 706/12 |
| 2014/0108018 A1* | 4/2014 | Phillips | G06F 17/275 704/275 |
| 2014/0200878 A1* | 7/2014 | Mylonakis | G06F 17/2854 704/4 |
| 2015/0286630 A1* | 10/2015 | Bateman | G06F 17/30241 704/9 |
| 2015/0309984 A1* | 10/2015 | Bradford | G06F 17/2863 704/8 |

* cited by examiner

*Primary Examiner* — Vincent Rudolph
*Assistant Examiner* — Stephen Brinich
(74) *Attorney, Agent, or Firm* — Onello & Mello, LLP.

(57) ABSTRACT

Technology is described for refining a language model for a language recognition system based on aggregating and analyzing word tag metadata from multiple users of the language. The technology allows a user to mark a word or phrase in a selected language (e.g., as offensive or misspelled, or as a part of speech or other category), combines information collected from multiple users of the selected language, and updates the user's language model based on the combined information from multiple users of the selected language.

18 Claims, 6 Drawing Sheets user dictionary table — 600

| Word | In database? | Tags |
|---|---|---|
| aardvark | yes | uncommon, don't suggest |
| USS Enterprise | added | noun phrase, capitalized |
| retarded | deleted | slang, don't suggest |
| judgement | no | misspelled |

— 601
— 602
— 603
— 604

— 621  — 622  — 623

*FIG. 6* aggregate tagged words table — 700

| Word | Number of users who deleted word | Percent of all users who deleted word | Percent of deleters who deleted word | Categories |
|---|---|---|---|---|
| aardvark | 5 | 0.02 | 0.04 | uncommon (10), vulgar (2) |
| Enterprise | 0 | 0 | 0 | proper noun (1701) |
| retarded | 886 | 2.2 | 4.4 | sensitive (420), slang (111) |
| judgement | 4500 | 11.2 | 22.4 | misspelled (4000) |

UPDATING LANGUAGE DATABASES USING CROWD-SOURCED INPUT

BACKGROUND

Users of electronic devices around the world enter text in various languages. A wide variety of language recognition systems are designed to enable users to enter text on such devices via one or more modes of input such as keyboard text entry, speech, and/or handwriting. Such language recognition systems often provide predictive features that suggest word completions, corrections, and/or possible next words in supported languages.

Language recognition systems typically rely on one or more language models that contain various information to help the language recognition system recognize or produce particular languages. Such information is typically based on statistical linguistic analysis of an extensive corpus of text in a particular language. It may include, for example, lists of individual words (unigrams) and their relative frequencies of use in the language, as well as the frequencies of word pairs (bigrams), triplets (trigrams), and higher-order n-grams in the language. For example, a language model for English that includes bigrams would indicate a high likelihood that the word "degrees" will be followed by "Fahrenheit" and a low likelihood that it will be followed by "Chanukah". In general, language recognition systems rely upon such language models—one or more for each supported language—to supply a lexicon of textual objects that can be generated by the system based on the input actions performed by the user and to map input actions performed by the user to one or more of the textual objects in the lexicon. Language models thus enable language recognition systems to perform next word prediction for user text entry.

Once a language model has been developed for a language and provided to users, language recognition systems typically allow users to build on or train their local language models to recognize additional words in that language and to remove undesired words according to their individual vocabulary use. The language recognition system may thus improve on its predictive ability for a particular user.

BRIEF DESCRIPTION OF THE DRAWINGS

FIG. 6 is a table diagram showing sample contents of a user dictionary table according to an implementation of the technology.

FIG. 7 is a table diagram showing sample contents of an aggregate tagged words table.

DETAILED DESCRIPTION

Figure 1:
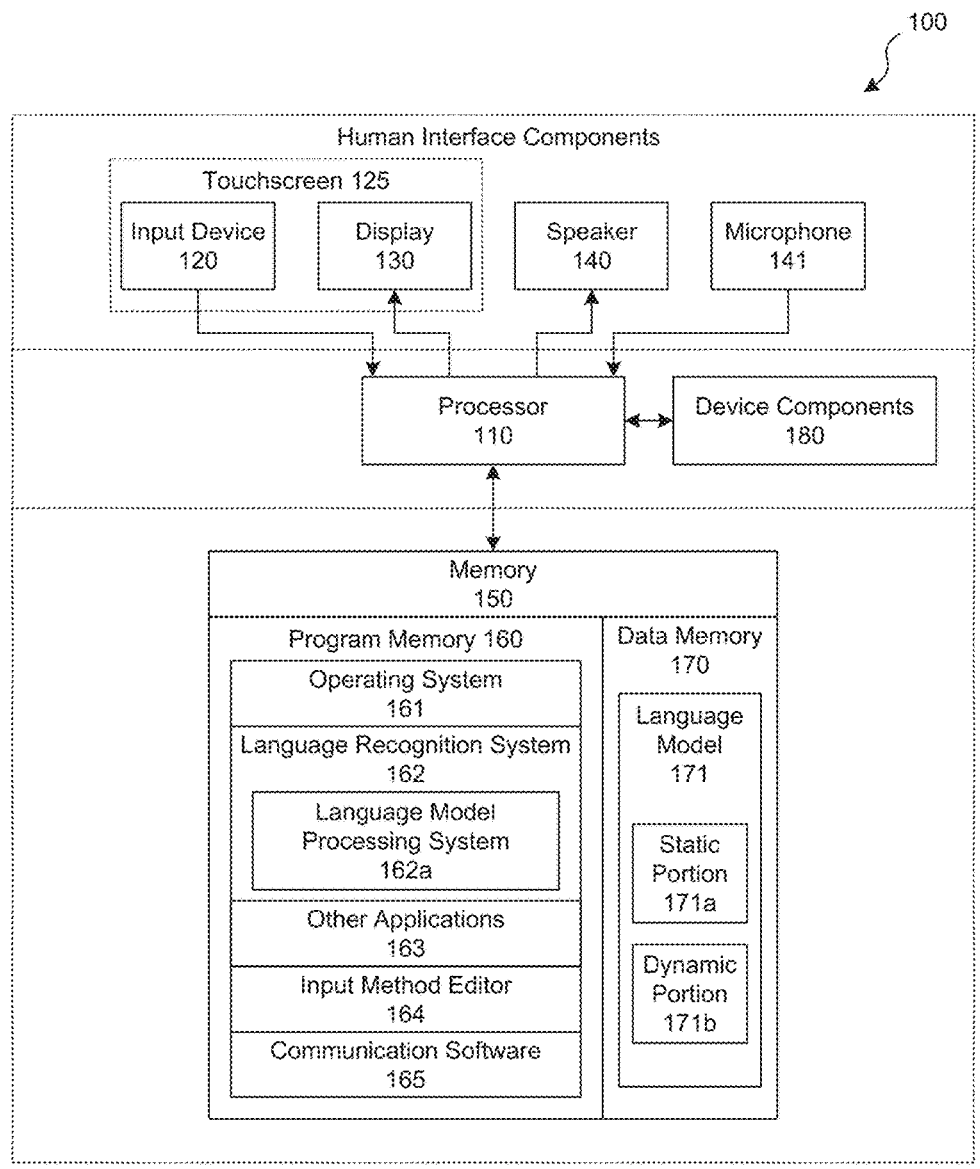
FIG. 1 is a block diagram showing some of the components typically incorporated in at least some of the computer systems and other devices on which the technology is implemented.

The headings provided herein are for convenience only and do not necessarily affect the scope or meaning of the claimed invention.

Overview

Language models have been developed for dozens of the world's major languages, including, e.g., English, French, and Chinese. In addition, crowd-sourced language model technology enables users to build language models for languages not yet supported by traditional language recognition systems. Such technology is disclosed, for example, in U.S. patent application Ser. No. 14/262,304, titled "Learning Language Models from Scratch Based on Crowd-Sourced User Text Input," filed on Apr. 25, 2014, commonly owned by the Applicant of the present application and incorporated herein by reference in its entirety.

In the field of language recognition systems, both conventionally developed and crowd-sourced models typically require manual review and annotation of language model vocabulary. For example, to improve the quality of a language database, it can be useful to classify words and to detect and eliminate profanity, misspellings, and/or other undesirable vocabulary so that data analysis (e.g., of word and n-gram frequency) can be limited to text that is likely to be representative of other users' expected input in that language. One conventional approach is to locate and hire linguists or native speakers with linguistic talents to refine a language database.

The inventors have recognized that the conventional approaches to refining language models have significant disadvantages. For instance, refining a word list for a language by hand with the assistance of native speakers is labor-intensive. In some cases (especially for minority languages) it may be difficult to contract language experts. If such resources are available, hiring experts to refine a dictionary can be expensive and time-consuming.

In addition, especially for crowd-sourced language models, undesirable words may be hard for third parties to pick out. For example, when a language model is small or when the number of users contributing to a crowd-sourced language model is small, it may be difficult to exclude highly technical, vulgar, and/or misspelled words (among other undesirable data) from accepted vocabulary. The challenge is multiplied when it is important to identify why a word should be excluded from a language model. Moreover, as language models grow—and as languages evolve—the need to refine and curate those language models also grows, so that refinement processes must be repeated or even be implemented on a continuous basis.

In view of these and other shortcomings of conventional approaches to refining language model vocabulary, the inventors have recognized that a new approach to categorizing language model words that is more democratic, less expensive, and more convenient would have significant utility.

Technology will now be described that enables users of language recognition systems to categorize words, such as offensive or misspelled words, in a language model. In various implementations, the technology allows users to identify words as undesirable by deleting them from their individual language model, and enables users to tag or mark words as profanity, out-of-language words, or common misspellings, for example. The technology refines a language model based on analysis of crowd-sourced tagging of words in the language. As a result, the technology allows language models to more accurately reflect users' actual language use and to quickly and precisely identify undesirable terms.

DETAILED DESCRIPTION OF FIGURES

The following description provides certain specific details of the illustrated examples. One skilled in the relevant art will understand, however, that the technology can be practiced without many of these details. Likewise, one skilled in the relevant art will also understand that the technology can include many other obvious features not described in detail herein. Additionally, some well-known structures or functions may not be shown or described in detail below, to avoid unnecessarily obscuring the relevant descriptions of the various examples.

FIG. 1 is a block diagram showing some of the components typically incorporated in at least some of the computer systems and other devices on which the technology is implemented. A system 100 includes one or more input devices 120 that provide input to a processor 110, notifying it of actions performed by a user, typically mediated by a hardware controller that interprets the raw signals received from the input device and communicates the information to the processor 110 using a known communication protocol. The processor can be a single CPU or multiple processing units in a device or distributed across multiple devices. Examples of an input device 120 include a keyboard, a pointing device (such as a mouse, joystick, or eye tracking device), and a touchscreen 125 that provides input to the processor 110 notifying it of contact events when the touchscreen is touched by a user. Similarly, the processor 110 communicates with a hardware controller for a display 130 on which text and graphics are displayed. Examples of a display 130 include an LCD or LED display screen (such as a desktop computer screen or television screen), an e-ink display, a projected display (such as a heads-up display device), and a touchscreen 125 display that provides graphical and textual visual feedback to a user. Optionally, a speaker 140 is also coupled to the processor so that any appropriate auditory signals can be passed on to the user as guidance, and a microphone 141 is also coupled to the processor so that any spoken input can be received from the user, e.g., for systems implementing speech recognition as a method of input by the user (making the microphone 141 an additional input device 120). In some implementations, the speaker 140 and the microphone 141 are implemented by a combined audio input-output device. The system 100 can also include various device components 180 such as sensors (e.g., GPS or other location determination sensors, motion sensors, and light sensors), cameras and other video capture devices, communication devices (e.g., wired or wireless data ports, near field communication modules, radios, antennas), and so on.

The processor 110 has access to a memory 150, which can include a combination of temporary and/or permanent storage, and both read-only memory (ROM) and writable memory (e.g., random access memory or RAM), writable non-volatile memory such as flash memory, hard drives, removable media, magnetically or optically readable discs, nanotechnology memory, biological memory, and so forth. As used herein, memory does not include a propagating signal per se. The memory 150 includes program memory 160 that contains all programs and software, such as an operating system 161, language recognition system 162, and any other application programs 163. The program memory 160 can also contain input method editor software 164 for managing user input according to the disclosed technology, and communication software 165 for transmitting and receiving data by various channels and protocols. The memory 150 also includes data memory 170 that includes any configuration data, settings, user options and preferences that may be needed by the program memory 160 or any element of the system 100.

The language recognition system 162 includes components such as a language model processing system 162a, for collecting, updating, and modifying information about language usage as described herein. In some implementations, the language recognition system 162 is incorporated into an input method editor 164 that runs whenever an input field (for text, speech, handwriting, etc.) is active. Examples of input method editors include, e.g., a Swype® or XT9® text entry interface in a mobile computing device. The language recognition system 162 can also generate graphical user interface screens (e.g., on the display 130) that allow for interaction with a user of the language recognition system 162 and the language model processing system 162a. In some implementations, the interface screens allow a user of the computing device to set preferences, provide language information, make selections regarding crowd-sourced language model development and data sharing, and/or otherwise receive or convey information between the user and the system on the device.

Data memory 170 also includes one or more language models 171 that in accordance with various implementations can include a static portion 171a and a dynamic portion 171b. The static portion 171a is a data structure (e.g., a list, array, table, or hash map) for an initial language model (including n-grams) generated by, for example, the system operator based on general language use. In contrast, the dynamic portion 171b is based on events in a language (e.g., vocabulary use, explicit word additions, word deletions, word tagging, word corrections, n-gram usage, and word counts or frequency measures) from one or more devices associated with an end user. In some cases (e.g., a new language) there may be no static portion 171a of the language model 171; the language recognition system language model processing portion 162a can modify the dynamic portion 171b of the language model 171 regardless of whether the language model 171 includes a static portion 171a.

The language recognition system 162 can use one or more input devices 120 (e.g., keyboard, touchscreen, microphone, camera, or GPS sensor) to detect one or more events associated with a local language model 171 on a computing system 100. Such events involve a user's interaction with a language model processing system 162a on a device. An event can be used to modify the language model 171 (e.g., the dynamic portion 171b). Some events may have a large impact on the language model (e.g., adding a new word or n-gram to an empty model, or deleting a suggested word and marking it as profanity), while other events may have little to no effect (e.g., using a word that already has a high frequency count). Events can include data points that can be used by the system to process changes that modify the language model. Examples of events that can be detected include new words, word deletions, user tagging of words (e.g., as offensive or misspelled, or by part of speech), use or nonuse markers, quality rating adjustments, frequency of use changes, new word pairs and other n-grams, and many other events that can be used for developing all or a portion of a language model. In addition to events, additional data can be collected and transmitted in conjunction with the events. Such additional data can include location information (e.g., information derived via GPS or cell tower data, user-set location, time zone, and/or currency format), information about the language(s) used in a locale (e.g., for determining dialects of language usage), and context information that describes applications used by the user in conjunction with the language processing system (e.g., whether text was entered in a word processing application or an instant messaging application). The additional data can be derived from the user's interaction with the system 100.

FIG. 1 and the discussion herein provide a brief, general description of a suitable computing environment in which the technology can be implemented. Although not required, aspects of the system are described in the general context of computer-executable instructions, such as routines executed by a general-purpose computer, e.g., a mobile device, a server computer, or a personal computer. Those skilled in the relevant art will appreciate that the technology can be practiced using other communications, data processing, or computer system configurations, e.g., hand-held devices (including tablet computers, personal digital assistants (PDAs), and mobile phones), wearable computers, vehicle-based computers, multi-processor systems, microprocessor-based consumer electronics, set-top boxes, network appliances, mini-computers, mainframe computers, etc. The terms "computer," "host," and "device" are generally used interchangeably herein, and refer to any such data processing devices and systems.

Aspects of the technology can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a local area network (LAN), wide area network (WAN), or the Internet. In a distributed computing environment, modules can be located in both local and remote memory storage devices.

Figure 2:
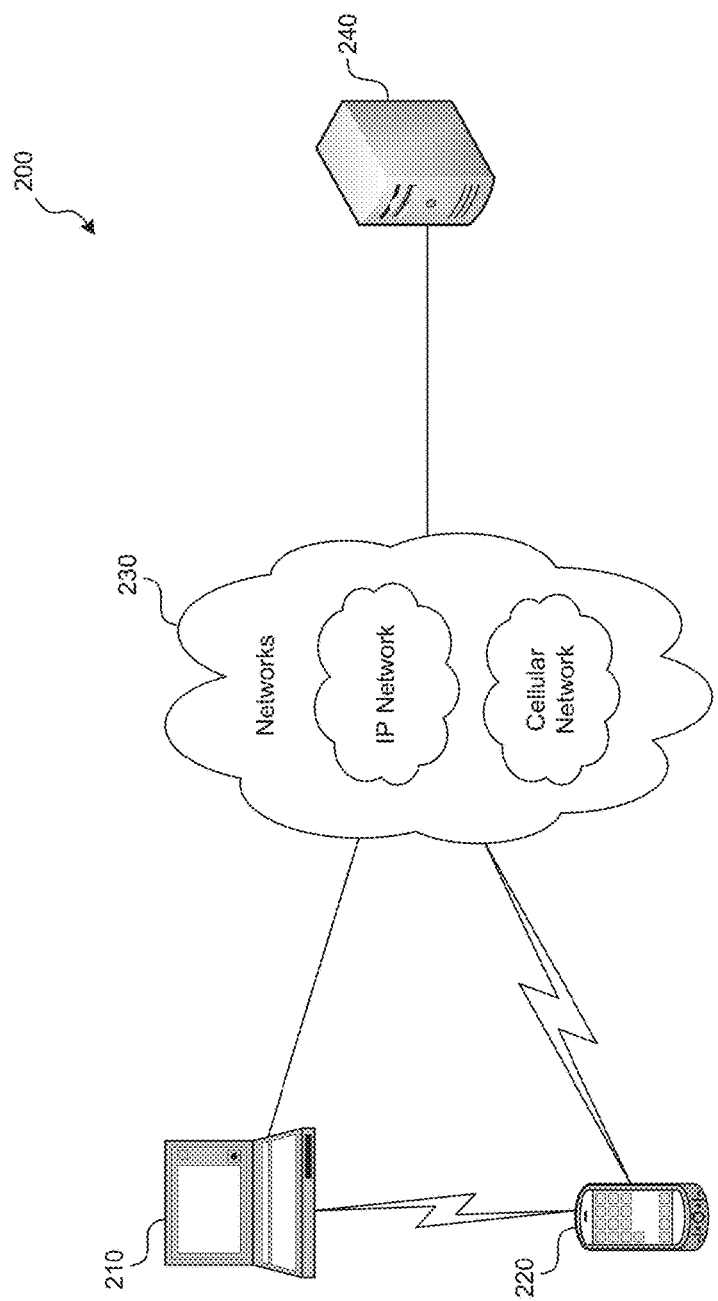
FIG. 2 is a system diagram illustrating an example of a computing environment in which the technology can be utilized.

FIG. 2 is a system diagram illustrating an example of a computing environment 200 in which the technology can be utilized. As illustrated in FIG. 2, a system for refining language models based on crowd-sourced user text input can operate on various computing devices, such as a computer 210, mobile device 220 (e.g., a mobile phone, tablet computer, mobile media device, mobile gaming device, wearable computer, etc.), and other devices capable of receiving user inputs (e.g., such as set-top box or vehicle-based computer). Each of these devices can include various input mechanisms (e.g., microphones, keypads, cameras, and/or touch screens) to receive user interactions (e.g., voice, text, gesture, and/or handwriting inputs). These computing devices can communicate through one or more wired or wireless, public or private, networks 230 (including, e.g., different networks, channels, and protocols) with each other and with a system 240 implementing the technology that coordinates language model information and aggregates information about user input in various languages. System 240 can be maintained in a cloud-based environment or other distributed server-client system. As described herein, user events (e.g., marking a deleted word in a particular language as offensive) can be communicated between devices 210 and 220 and to the system 240. In addition, information about the user or the user's device(s) 210 and 220 (e.g., the current and/or past location of the device(s), languages used on each device, device characteristics, and user preferences and interests) can be communicated to the system 240. In some implementations, some or all of the system 240 is implemented in user computing devices such as devices 210 and 220. Each language recognition system on these devices can be utilizing a local language model. Each device can have a different end user.

Figure 3:
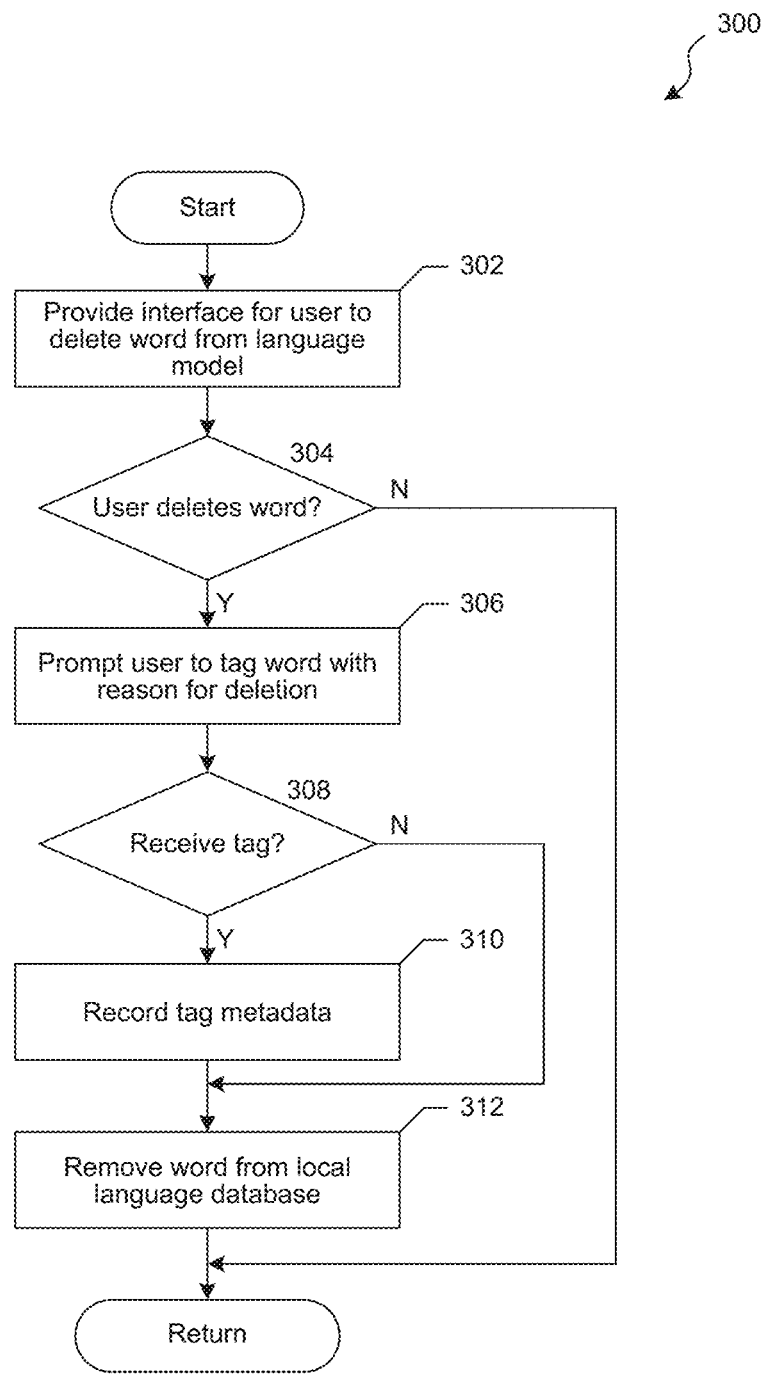
FIG. 3 is a flow diagram illustrating a routine for deleting a word or phrase from a user's language model.

FIG. 3 is a flow diagram illustrating a routine 300 for deleting a word or phrase from a user's language model 171. The routine 300 illustrated in FIG. 3 can be performed by one or more components (e.g., the processor 110 and/or language model processing system 162a of FIG. 1). In some instances, for example, a user who is entering text on an electronic device may enter an undesired word, or a language recognition system may suggest an undesired word or phrase. The routine 300 of FIG. 3 enables the user to quickly mark the word or phrase for deletion from the user's local language database and tag the reason for deletion.

At step 302, the routine 300 provides a user interface for deleting a selected or otherwise indicated word or phrase from the user's local language model. In various implementations, the system can provide interfaces such as a dedicated dictionary icon on a virtual keyboard, a contextual menu activated by a defined gesture, a voice command, etc. In some implementations, if no word or phrase is explicitly selected, the routine 300 operates on the most recently entered or suggested word or phrase as a default selection. At step 304, the routine 300 determines whether the user has indicated a desire to delete the word or phrase from the user's language database (e.g., from a set of words that the language recognition system suggests or auto-completes). If the user does not wish to delete the word or phrase, the routine 300 ends. Otherwise, the routine 300 continues to step 306.

At step 306, the routine 300 prompts the user to tag the word or phrase with one or more reasons for deletion. For example, the routine 300 can present a dialog on the touchscreen 125 enabling the user to select one or more listed options. The options can include tagging a word as, e.g., a misspelling, offensive, sensitive, or unwanted for another reason or an unspecified reason.

In various implementations, the routine 300 can prompt a user to provide differing levels of detail for the user's objection to a word or phrase. In some implementations, the language recognition system enables the user to specify preferences for specificity. Accordingly, if a user chooses to engage in more specific categorization, then in return for providing more involved feedback, the language recognition system can tailor the user's language database to that user's preferences more specifically. For example, where a general categorization option can enable a user to tag a word as "offensive," more specific categorization options can enable a user to indicate why the word is offensive: explicit (e.g., the f-word); a derogatory epithet (e.g., the n-word); etc. Similarly, the technology can enable a user to identify a misspelled word, and/or to specify that the word is miscapitalized (case) and/or mis-accented (diacritical marks).

Continuing at step 308, the routine 300 determines whether a tag has been received. If the user elected not to tag the word for deletion, then the routine 300 continues at step 312. Otherwise, the routine 300 continues at step 310. At step 310, the routine 300 records the tag metadata about the word or phrase. Further details about how the technology can collect and use the recorded tags are described below in connection with FIG. 5. At step 312, the routine 300 removes the selected word or phrase from the user's local language database. After step 312, the routine 300 ends.

Figure 4:
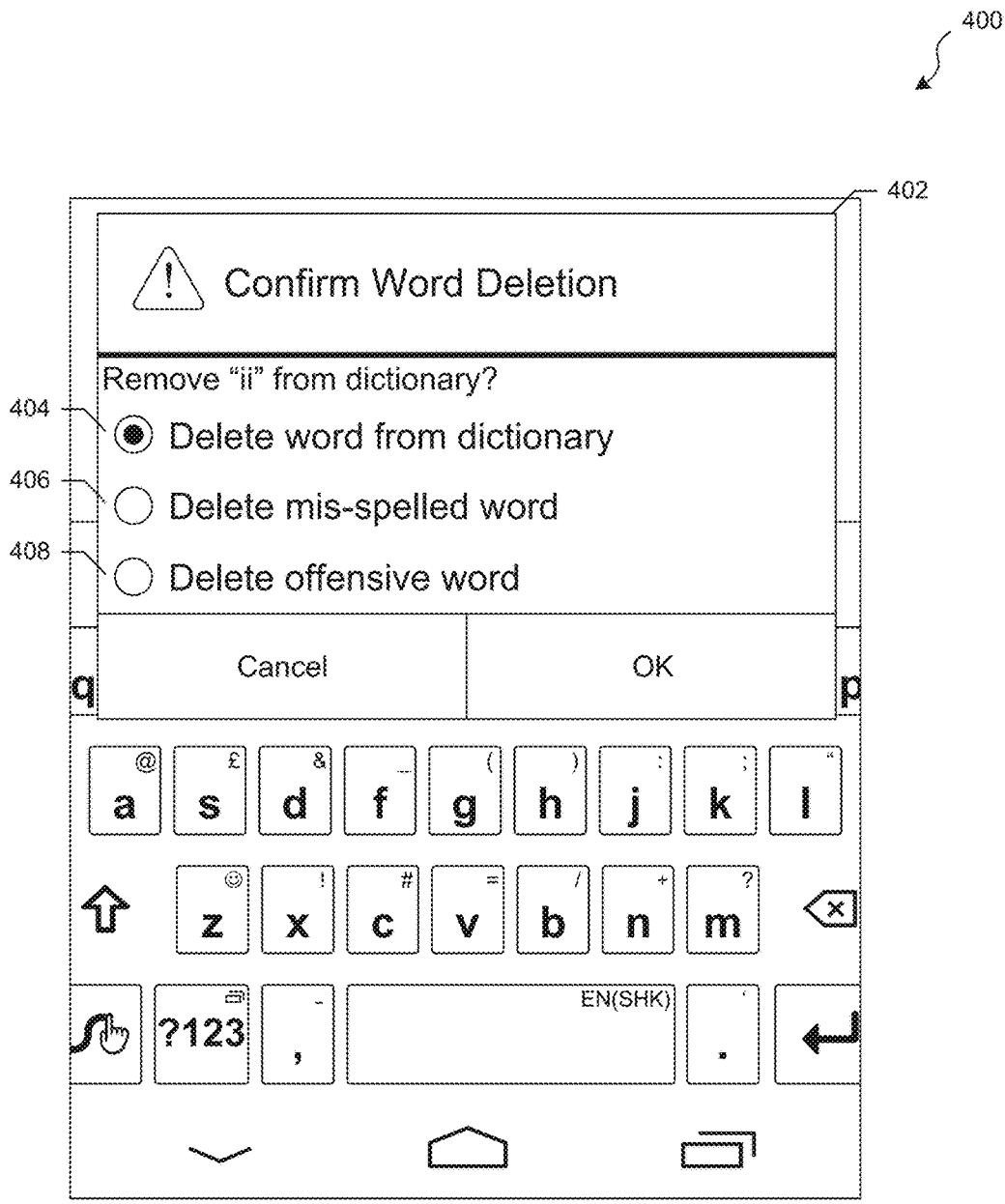
FIG. 4 is a display diagram illustrating a screen display or graphical user interface (GUI) associated with tagging a reason for deleting a word.

FIG. 4 is a display diagram illustrating a screen display or graphical user interface (GUI) associated with tagging a reason for deleting a word. In some implementations, the system 100 displays the depicted information on the touchscreen 125. The display page 400 illustrates a dialog 402 prompting the user to confirm a word deletion. In the illustrated implementation, the dialog 402 asks the user to confirm the removal of "ii" from the dictionary, presenting "Cancel" and "OK" user interface buttons. The dialog 402 displays three options. Option 404, which has been preselected, allows the user to delete the word from the dictionary without further tagging. Option 406 allows the user to delete the word as misspelled. And option 408 allows the user to delete the word as offensive. As described above in connection with FIG. 3, in various implementations, the technology can present multiple different and/or more specific options and various interfaces of different complexity for tagging undesired words or phrases.

In various implementations, the technology allows users to tag words and/or phrases without deleting them. For example, the system 100 can provide a variety of user interfaces that enable users to tag words: a "mark this" button on a virtual keyboard, a contextual menu to select tags triggered by a key or a long-press (press-and-hold) on a touch interface, a special gesture, a dictionary icon or dedicated app, etc.

In some implementations, the technology can allow a user to mark a word as sensitive, so that it is not deleted from the user's language database, but will not be suggested by the language recognition system. For example, shocking words such as "rape," mild epithets such as "retarded," and/or colloquial terms like "crap" may be valid dictionary words that a user nevertheless does not want to see suggested. Other words may be tagged as sensitive depending on their usage or context. For example, the word "Oriental" may be unobjectionable when describing rugs, but inappropriate in the context of describing people. Similarly, the word "shag" when used to refer to a carpet fabric (or the adjective "shaggy" referring to hair) is innocuous, but when used to refer to sexual intercourse may be considered vulgar slang. In some implementations, the technology can enable the user to tag words as context- or usage-dependent, and/or can determine that a word may be undesirable in some usages or contexts based on user tagging patterns. The routine 300 can also enable the user to mark valid terms that the user does not employ, such as technical terms or jargon not relevant to the user and out-of-language words. By enabling the user to specify the reason for tagging a word or phrase, the technology can learn the user's vocabulary choices and, for example, tailor the user's language database based on the user dictionaries of other users who have similar tagging patterns.

Figure 5:
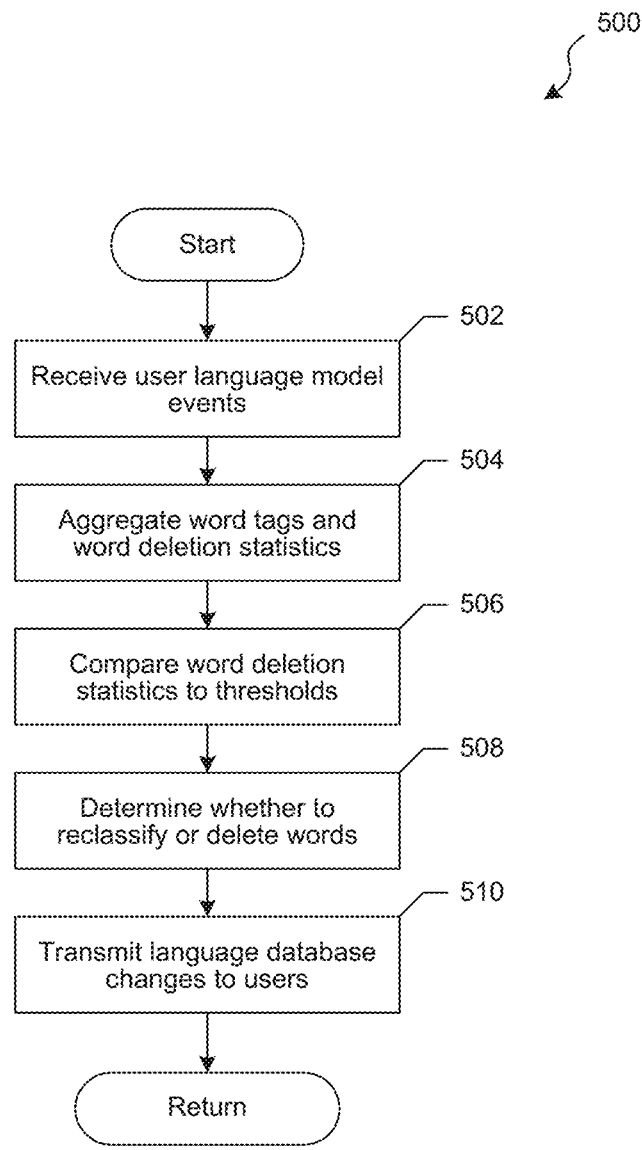
FIG. 5 is a flow diagram illustrating a routine for processing user language model tagging events.

FIG. 5 is a flow diagram illustrating a routine 500 for processing user language model tagging events. The routine 500 illustrated in FIG. 5 can be performed by one or more components (e.g., the system 240 of FIG. 2). In some instances, for example, a number of users may tag the same undesired word or phrase in a language database. The routine 500 of FIG. 5 enables the system to determine that the tagged word should be reclassified (e.g., as a sensitive word) or removed from language databases of other users.

At step 502, the routine 500 receives language model events including user-assigned word tags from one or more users utilizing a particular language. In some implementations, the routine 500 surveys user devices associated with a particular language model on a regular basis. In some implementations, the routine 500 receives updates about a user's language model tagging information occasionally when such information is available and a connection to the system is present, rather than on a defined or regular schedule. In some implementations of the technology, the routine 500 prompts updates to be transmitted by each user device 100 on a periodic or continuous basis. In some implementations, language model word tag information is transmitted as part of a process to synchronize the contents of the dynamic portion 171b with remotely hosted data (e.g., cloud-based storage) for backup and transfer to other databases. The language model processing system 162a and communication software 165 can send language model word tag events individually, or in the aggregate, to the system 240. In some implementations, the communication software 165 monitors the current connection type (e.g., cellular or Wi-Fi) and can make a determination as to whether events and updates should be transmitted to and/or from the device; it can base the determination on other information such as event significance and/or user preferences. In some implementations, language model events are processed in the order that they occurred, allowing the dynamic portion 171b to be updated in real time or near-real time. In some implementations, the system can process events out of order to update the dynamic portion 171b. For example, more important events can be prioritized for processing before less important events.

At step 504, the system aggregates language model events for a language from multiple users, including the tags assigned to a word by different users and information about how many users deleted a given word. By aggregating a large number of individual users' word tagging decisions and word deletion patterns, the technology can build a crowd-sourced language model that reflects general usage among the participants and averages out individual peculiarities of language usage. The system can consider a geographic region associated with users who have tagged words. Thus, the system can include not only the tags, but also associate GPS coordinates with those tags so as to aggregate and process only tags within a determined geographic region. The system can thereby provide greater granularity or accuracy with changes in language models (e.g. to adopt a particular vernacular associated with a geographic region).

In some implementations, the routine 500 provides greater weight to tags submitted by one or more users of a language. For example, the technology can identify or rank users with the largest number of tags entered in a language, and/or the most accurate tagging tendencies when compared to the crowd of language taggers as a whole. The technology can solicit tags from such users and crowd-source the results by requiring a threshold level of agreement between such users before applying the tags to the language model. The technology can provisionally apply such tags to the language model and reverse them if a significant number of users undo the provisional corrections. The technology can allow users to self-identify linguistic experience, expertise, or authority, or to request to be treated as experts in the language. The technology can give less weight to edits by users whose tags are less popular. The technology can also identify or rank users based on whether and how much they use words tagged as offensive or otherwise undesirable by other users. For example, the routine 500 can determine that some users are more careful in their vocabulary usage than others, and thus weight their input more heavily.

In some implementations, the aggregation takes into account the contexts of various local language model events, e.g., the type of device on which a user tagged a word, the mode in which the tagged text was entered (e.g., voice recognition, keyboard typing, or handwriting interpretation), and/or a user's differing vocabulary in different applications or contexts such as Web searching, instant messaging, and word processing; as well as indicia such as the size of the vocabulary used by a user and the user's respective propensity to profanity. The comparison may reveal that some users share vocabulary choices in particular contexts. In some implementations, the technology applies different rules based on context or otherwise treats text entered in different contexts differently. For example, the technology can apply different treatment to words entered in an instant messaging application (e.g., SMS text, MMS, or other informal chat) where space is limited and users commonly use non-standard abbreviations (e.g., "u" for "you"). By aggregating word tags in connection with a particular context (e.g., when texting), the routine 500 can identify whether users accept abbreviations, misspellings, and/or crude language in one context but tag such words as undesirable in another context (e.g., business email).

At step 506, the routine 500 compares word tags and/or deletions (e.g., within a particular context) to statistical and/or numeric thresholds. For example, before striking a word from other users' language databases, the routine 500 can require a threshold number or percentage of users to have deleted the word (or, e.g., tagged it as offensive). In some implementations, the routine 500 can require a threshold percentage (e.g., 10%) of the users who identify any words as profanity to identify a particular word as profanity before the routine 500 will exclude that word as probable profanity. By requiring a threshold level of agreement (e.g., a number of separate users and/or a significant percentage of users), the technology improves the likelihood that a word is generally seen as undesirable and so that the system does not overreact to a single tag but can act promptly when wide agreement among users is evident.

At step 508, the routine 500 determines whether to reclassify or delete tagged words. In some implementations, the routine 500 maintains multiple lists of words including, e.g., a complete word list, a whitelist of basic vocabulary not to be deleted (e.g., the top five percent of commonly used words), a blacklist of misspellings and other intrinsic errors, a list of offensive words, a list of profanity, a sensitive word list to allow but avoid suggesting to users, a list of pornography-related words, lists of jargon and technical vocabulary (of various categories), a list of uncommon words, etc. In some implementations, the routine 500 can classify a word into multiple lists based on crowd-sourced word tagging. Step 508 can also ensure that core vocabulary words are not improperly deleted from a language model, or that such changes are not promulgated to other users. In some implementations, the technology automatically classifies tagged phrases and words; in other implementations, the technology produces recommendations and/or statistics to inform decisions on updating a language database that applies to a population of users.

At step 510, the routine 500 updates individual users' language models with the resulting word classifications based on the aggregated crowd-sourced word tags. The routine 500 can vary the timing and extent of updates, which can include the entire updated language model or incremental updates to a user's language model (including information about words categorized into undesired vocabulary lists). The technology can provide continuous updates to computing devices (e.g., devices 210 and/or 220 of FIG. 2), can send updates in batches, can send updates when requested by a user, or can send updates when needed by the user (e.g., when a user changes to a particular language having vocabulary tagged through a crowd-sourced process). After step 510, the routine 500 ends.

In some implementations, the technology allows a user to adjust or customize the filtering of various categories of words. For example, a percentage of users enjoy using profanity and may want to keep swear words in their active language model (e.g., generally or in specific contexts; or only for specific categories or examples of swear words). When a language database includes metadata identifying a list of words as profanity as a result of crowd-sourced tagging, such users can simply indicate a preference to allow selected profanity in their vocabulary usage. (The technology can prompt the user to confirm that choice after presenting a warning.) The system recognizes users who have selected that preference and can avoid contributing profanity back to a general language model, so that the technology will not propose profanity as word suggestions to others who have not made a similar selection in their language recognition systems.

In various implementations, the technology enables users to tag words for purposes other than identifying potentially undesired vocabulary. For example, the technology enables users to add vocabulary to a crowd-sourced language database, providing metadata about words such as their part of speech (verb, adjective), dialect or usage information, idioms, etc. The technology can therefore help in the creation of a new language model and/or assist in the development of a model to preserve a language, etc. The technology is thus relevant to speakers and proponents of minority languages, such as immigrant communities, organizations supporting the preservation of dying languages, and governmental and private-sector language standardization and promotion authorities and advocacy groups. It is also relevant to less formal language communities such as fan communities who share a specialized vocabulary.

FIG. 6 is a table diagram showing sample contents of a user dictionary table 600 according to an implementation of the technology. The user dictionary table 600 is made up of rows 601-604, each representing a word that the user has tagged. Each row is divided into the following columns: a word column 621 containing the word that the user has tagged; an "In database?" column 622 identifying whether the word is in the user's language database; and a tags column 623 listing the user's tags for the word.

For example, row 601 indicates that the word "aardvark" is in the user's language database 171, and that the user has tagged it as an uncommon word that the language prediction system 162 should not suggest. Row 602 indicates that the user has added the phrase "USS Enterprise" to the user's language model, tagging it as a noun phrase that should be capitalized. Row 603 indicates that the user has deleted the word "retarded" from the user's language database, tagging it as a slang word that should not be suggested (to users who have not deleted it from their language models). And row 604 indicates that the word "judgement" is a word that the user has flagged as misspelled. The table thus shows the technology having enabled a user to tag words and phrases for various purposes.

FIG. 7 is a table diagram showing a simple example of contents of an aggregate tagged words table 700. The aggregate tagged words table 700 is made up of rows 701-704, each representing a word that a number of users have tagged. Each row is divided into the following columns: a word column 721 containing the word that users have tagged; a user-deletions column 722 identifying the number of users who deleted the word from their language model; a percentage-of-users column 723 identifying the percentage of users who deleted the word from their language model; a percentage-of-deleters column 724 identifying, out of users who deleted any words from their language model, the percentage who deleted the word in question; and a categories column 725 listing the categories into which a word has been classified as a result of aggregating users' tags for the word according to an implementation of the technology.

In this simple example, row 701 indicates that five users deleted the word "aardvark" from their language models, that those five people who deleted "aardvark" make up just 0.02 percent of all users and 0.04 percent of users who deleted any words, and that ten people tagged "aardvark" as uncommon, and two tagged it as vulgar. This illustrates that small numbers of deletions and tags will tend to fall below the thresholds for promulgating changes to other users' language models. Row 702 indicates that the word "Enterprise" was not deleted by anyone, but that 1701 users tagged "Enterprise" as a proper noun. This illustrates the usefulness of the technology for adding words to a language model, rather than just for tagging words for deletion. Row 703 indicates that 886 users (2.2% of all users, and 4.4% of those who deleted any words) deleted the word "retarded" from their language databases, and that as a result of user tagging it can be classified as a sensitive word that should not be suggested, and as slang. And row 704 indicates that the word "judgement" was deleted by 4500 users (11.2% of all users, and 22.4% of those who deleted any words) and tagged by 4000 as misspelled. The table thus depicts crowd-sourced tagging of words and phrases to refine a language model.

Though the contents of user dictionary table 600 and the aggregate tagged words table 700 are included to present a comprehensible example, those skilled in the art will appreciate that the technology can use tables having columns corresponding to different and/or larger numbers of columns, as well as a larger number of rows. For example, a separate table can be provided for each language. Columns that can be used include, for example, various types of user data, language information, language model data (including, e.g., words and word frequencies), language model metadata (e.g., language popularity statistics and thresholds for crowd-sourcing), location data, and individual tag or category data. Though FIGS. 6 and 7 show tables whose contents and organization are designed to make them more comprehensible by a human reader, those skilled in the art will appreciate that actual data structures used by the technology to store this information can differ from the table shown. For example, they can be organized in a different manner (e.g., in multiple different data structures); can contain more or less information than shown; can be compressed and/or encrypted; etc.

CONCLUSION

This application is related to U.S. patent application Ser. No. 14/262,304, titled "Learning Language Models from Scratch Based on Crowd-Sourced User Text Input," filed on Apr. 25, 2014; U.S. patent application Ser. No. 13/869,919, titled "Updating Population Language Models Based on Changes Made by User Clusters," filed on Apr. 24, 2013; and U.S. patent application Ser. No. 13/834,887, titled "Subscription Updates in Multiple Device Language Models," filed on Mar. 15, 2013; which are each commonly owned by the Applicant of the present application and hereby incorporated by reference for all purposes and in their entireties.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. The words "predict," "predictive," "prediction," and other variations and words of similar import are intended to be construed broadly, and include suggesting word completions, corrections, and/or possible next words, presenting words based on no input beyond the context leading up to the word (e.g., "time," "the ditch," "her wound," or "my side" after "a stitch in") and disambiguating from among several possible inputs.

The above Detailed Description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various examples described above can be combined to provide further implementations of the disclosure. Some alternative implementations of the disclosure can include not only additional elements to those implementations noted above, but also can include fewer elements.

These and other changes can be made to the disclosure in light of the above Detailed Description. While the above description describes certain examples of the disclosure, and describes the best mode contemplated, no matter how detailed the above appears in text, the disclosure can be practiced in many ways. Details of the system can vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates the various aspects of the disclosure in any number of claim forms. For example, while only one aspect of the disclosure is recited as a computer-readable memory claim, other aspects can likewise be embodied as a computer-readable memory claim, or in other forms, such as being embodied in a means-plus-function claim. (Any claims intended to be treated under 35 U.S.C. § 112(f) will begin with the words "means for", but use of the term "for" in any other context is not intended to invoke treatment under 35 U.S.C. § 112(f).) Accordingly, Applicants reserve the right to pursue additional claims after filing this application to pursue such additional claim forms, in either this application or in a continuing application.

We claim:

1. A non-transitory computer-readable memory having contents configured to cause at least one computer having a processor to perform a method, the method comprising:
   providing a language model for a selected language to various computing devices of multiple users of the selected language,
      wherein the language model is accessible and modifiable via a language recognition system, and
      wherein the language model includes a dynamic portion;
   causing display of an interface for user input to delete a word from the dynamic portion of the language model;
   receiving, via the interface, a user's input to delete a word from the dynamic portion of the language model;
   in response to the input to delete a word from the language model, prompting, via the interface, the user to provide a reason for the deletion;
   in response to the prompting, receiving input identifying one or more reasons for the deletion;
   collecting, from the various computing devices, the received input identifying the reasons for the multiple users' deletions of words in the selected language;
   aggregating the collected input from the various computing devices about the deletions;
   generating updates to the dynamic portion of the language model based on the aggregated input about the deletions; and
   transmitting the generated language model updates to the various computing devices.

2. The computer-readable memory of claim 1 wherein providing the language model for the selected language includes building a language model with crowd-sourced vocabulary.

3. The computer-readable memory of claim 1 wherein prompting the user to provide information about the deletion includes prompting the user to classify the deleted word, and wherein prompting the user to classify the deleted word includes prompting the user to indicate whether the deleted word is at least one of a misspelling, offensive, profanity, sensitive, pornography-related, jargon, technical vocabulary, or uncommon.

4. The computer-readable memory of claim 1 wherein prompting the user to provide information about the deletion includes prompting the user to classify the deleted word.

5. The computer-readable memory of claim 1 wherein causing the display of the user input interface to delete a word from the language model and prompting the user to provide information about the deletion include enabling the user to use one of multiple deletion options, such that different deletion options provide different information about the deletion.

6. The computer-readable memory of claim 1 wherein aggregating the collected input from the various computing devices about the deletions includes determining whether a threshold number or percentage of users provided consistent information about the deletions, and wherein the threshold number or percentage of users is based on the number of the multiple users of the selected language who delete a word from the language model or based on the number of the multiple users of the selected language who provide information about their deletion of a word from the language model.

7. The computer-readable memory of claim 1 wherein aggregating the collected input from the various computing devices about the deletions includes determining whether a threshold number or percentage of users provided consistent information about the deletions.

8. The computer-readable memory of claim 1 wherein generating updates to the language model includes classifying a word, modifying weighting of a word, determining whether to include a word in suggestions provided by a language recognition system, or assigning a word to a list of objectionable or blacklisted words.

9. The computer-readable memory of claim 1, further comprising causing display of an option for a user to include or exclude a classification of words in the language model on a computing device of the user, and wherein causing the display of the option for a user to include or exclude a classification of words includes offering whether to enable a language recognition system to recognize or suggest words classified as profanity.

10. The computer-readable memory of claim 1, further comprising causing display of an option for a user to include or exclude a classification of words in the language model on a computing device of the user.

11. A method in a computing system of assisting in refining a language model used by a language recognition system to predict words in a language, the method comprising:
   receiving a selection of a word in the language by a user of the computing system;
   causing display of an interface on the computing system for the user to associate at least one category with the selected word;
   receiving, via the interface, user input associating a category with the selected word;
   storing the received category association information in a language model on the computing system;
   transmitting the recorded category association information to a remote computer;
   receiving from the remote computer updates to the language model on the computing system based on additional information associating one or more words in the language with one or more categories by other users of the language; and
   determining by the language recognition system whether to predict a word in the language in response to user input, based on whether the word is associated with a category in the updated language model including the additional information from other users of the language.

12. The method of claim 11 wherein the selection is a word suggested by the language recognition system based on the language model.

13. The method of claim 11 wherein a word includes an n-gram.

14. The method of claim 11 wherein receiving a selection of a word includes receiving input to delete the word from the language model or add the word to the language model.

15. The method of claim 11 wherein receiving user input associating a category with the selected word includes receiving user input identifying the word as profanity, out-of-language, or misspelled.

16. The method of claim 11, further comprising providing a set of categories from which the user can associate a category with the selected word, wherein a category or an order of categories is determined based on category association user input from other users.

17. A method, comprising:
providing a language model for a selected language to various computing devices of multiple users of the selected language,
wherein the various computing devices include language recognition systems,
wherein the language model is accessible by the language recognition systems at the various computing devices in order to assist the language recognition systems in recognizing or producing a language associated with the language model,
wherein the language model is modifiable via the language recognition systems;
causing display of an interface for user input to delete a word from the language model;
receiving, via the interface, a user's input to delete a word from the language model;
in response to the input to delete a word from the language model, prompting, via the interface, the user to provide a reason for the deletion;
in response to the prompting, receiving input identifying one or more reasons for the deletion;
collecting, from the various computing devices, the received input identifying the reasons for the multiple users' deletions of words in the selected language;
aggregating the collected input from the various computing devices about the deletions;
generating updates to the language model based on the aggregated input about the deletions; and
transmitting the generated language model updates to the various computing devices, in order to modify the provided language models at the various computing devices using the generated language model updates.

18. The method of claim 17, wherein generating updates to the language model includes classifying a word, modifying weighting of a word, determining whether to include a word in suggestions provided by a language recognition system, or assigning a word to a list of objectionable or blacklisted words.

* * * * *